(12) United States Patent
Rokugo et al.

(10) Patent No.: US 6,947,427 B1
(45) Date of Patent: Sep. 20, 2005

(54) TRANSMISSION METHOD AND NETWORK SYSTEM FOR ACCOMMODATING A PLURALITY OF KINDS OF TRAFFIC IN A COMMON NETWORK

(75) Inventors: Yoshinori Rokugo, Tokyo (JP); Motoo Nishihara, Tokyo (JP); Kazuo Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 701 days.

(21) Appl. No.: 09/669,565

(22) Filed: Sep. 26, 2000

(30) Foreign Application Priority Data

Sep. 29, 1999 (JP) ................................ 11/277244

(51) Int. Cl.$^7$ ............................................ H04L 12/56
(52) U.S. Cl. ................... 370/395.5; 370/469
(58) Field of Search ............................. 370/352, 355, 370/389, 392, 395.21, 395.3, 395.5–395.53, 370/465, 469, 474

(56) References Cited

U.S. PATENT DOCUMENTS

| | | | |
|---|---|---|---|
| 5,469,434 A | * | 11/1995 | Kurdzo et al. .............. 370/364 |
| 5,568,475 A | * | 10/1996 | Doshi et al. ................. 370/399 |
| 5,936,965 A | * | 8/1999 | Doshi et al. ................. 370/469 |
| 6,377,574 B1 | * | 4/2002 | Endo ........................... 370/359 |
| 6,389,035 B1 | * | 5/2002 | Bertagna et al. ............ 370/465 |
| 6,574,211 B2 | * | 6/2003 | Padovani et al. ........... 370/347 |
| 6,603,768 B1 | * | 8/2003 | Bleszynski et al. ......... 370/397 |
| 2002/0024699 A1 | * | 2/2002 | Tomooka et al. ........... 359/134 |

* cited by examiner

Primary Examiner—John Pezzlo
Assistant Examiner—Donald L. Mills
(74) Attorney, Agent, or Firm—Sughrue Mion, PLLC

(57) ABSTRACT

A transmission method and a network system can accommodate STM, ATM and IP in a single network by newly proposing a frame network to be used in common in physical layer and data link layer. The transmission method includes transmitting a plurality of packets in multiplexing manner, which header in each packet includes a first field holding a signal indicative of a packet length, a second field holding a signal indicative of a preferential order upon transferring the packet, a third field holding a signal indicative of a kind of traffic, a fourth field holding a signal indicative of a header length, a fifth field holding a control signal depending upon the kind of traffic, and a sixth field holding a signal indicative of a result of CRC operation of the header, a payload holding information signal depending upon kind of the traffic and a signal indicative of a result of CRC operation of the payload.

31 Claims, 9 Drawing Sheets

| HEADER 12 BYTES | PAYLOAD 0 TO 64 KBYTES | PAYLOAD CRC 16/32 |
|---|---|---|

HEADER STRUCTURE IN CASE OF STM

HEADER STRUCTURE IN CASE OF ATM

HEADER STRUCTURE IN CASE OF IPv4 AND IPv6 FOR TRANSFERRING USING LABEL TECHNOLOGY

HEADER STRUCTURE OF CASE OF IPv4 AND IPv6 TRANSFERRING USING ADDRESS IN NETWORK

EXTENDED CONDITION OF HEADER

OAM PACKET

| PACKET LENGTH (12 BYTES) ||
|---|---|
| K1 | K2 |
| ORDER WIRE | DCC1 |
| DCC2 | DCC3 |
| REMOTE ALARM | REMOTE MONITOR |
| HEADER CRC 16 ||

STAFF BYTES

TRANSMISSION METHOD AND NETWORK SYSTEM FOR ACCOMMODATING A PLURALITY OF KINDS OF TRAFFIC IN A COMMON NETWORK

BACKGROUND OF THE INVENTION

1. Field of the Invention

The present invention relates generally to a transmission method and a network system. More particularly, the invention relates to a transmission method and a network system for accommodating a plurality of kinds of traffic (STM, ATM, IP, and so forth) in a common network.

2. Description of the Related Art

Conventional networks have been constructed with using a circuit switched network centered at a voice telephone network and private line as a center thereof. However, in recent years, associating with quick growth of internet, networks using an IP (internet protocol) are abruptly growing. Also, in the sound circuit, the increase of traffic using modems stresses a use condition of circuit switching system.

On the other hand, as modes of circuit switching, there are Synchronous Transfer Mode (STM), Asynchronous Transfer Mode (ATM) and Internet Protocol (IP) establishing respectively independent networks. For example, IP data is transferred to an IP network established by routers and private lines after a circuit switching process, and an ATM network is established as the system considering data transfer. The transmission system is sped up by Synchronous Optical Network/Synchronous Digital Hierarchy SONET/SDH) and is increased in capacity by introduction of Dense Wavelength Division Multiplexing (DWDM).

However, as a result that operation of establishing the independent networks with a complicated compromise of various factors, establishment, operation and maintenance of the networks becomes complicated. Accordingly, for solving such problems, it is inherent to accommodate STM, ATM and IP in a single network.

SUMMARY OF THE INVENTION

The present invention has been worked out in order to solve such problems. It is, therefore, an object of the present invention to provide a transmission method and a network system which can accommodate STM, ATM and IP in a single network by newly proposing a frame network to be used in common in a physical layer and a data link layer.

According to the first aspect of the present invention, a transmission method comprises:

transmitting a plurality of packets in multiplexing manner, which header in each packet includes a first field holding a signal indicative of a packet length, a second field holding a signal indicative of a preferential order upon transferring the packet, a third field holding a signal indicative of a kind of traffic, a fourth field holding a signal indicative of a header length, a fifth field holding a control signal depending upon the kind of traffic, and a sixth field holding a signal indicative of a result of CRC operation of the header, a payload holding information signal depending upon kind of the traffic and a signal indicative of a result of CRC operation of the payload.

In an exemplary embodiment, the traffic is one or more kinds among a synchronous transmission mode (STM), asynchronous transmission mode (ATM) and an internet protocol (IP). The payload may have a maximum length and a variable length.

The fifth field may include a field holding a signal indicative of a destination address, a field holding a signal indicative of a sender address, a field holding a remote alarm indicative of an alarm condition in a remote station, and a field holding a remote monitor indicative of a signal receiving condition of the remote station, and the header forms a header of the packet for transmitting a synchronous transmission mode signal.

In the alternative, the fifth field may include a field holding a signal indicative of a destination address, a field holding a signal indicative of a sender address and a field reserved for future use, and the header is a header of the packet for transmission of an asynchronous transmission mode cell.

In the further alternative, the fifth field may include a field holding a signal indicative of a label and a field reserved for future use, and the header is a header for transmitting the packet according to IPv4 or IPv6 using a label technology.

In a still further alternative, the fifth field may include a field holding a signal indicative of a destination address and a field holding a route information and an identifier for controlling traffic class and flow spreading, and the header is a header for transmitting the packet according to IPv4 or IPv6 using an address in the network.

In either case, the header may further include an extendable field by option following the sixth field.

The multiplexed packet may further include an OAM packet used for maintenance of a network and management of operation, and stuff bytes for maintaining a period of the multiplexed packet. The OAM packet may include a field holding a byte for automatic protection switch, a field holding an order wire, a field of holding a data communication channel, a field holding a remote alarm indicative of alarm condition in the remote station, and a field holding a remote monitor indicative of the signal receiving condition in the remote station.

The stuff byte and the first field holding the signal indicative of the packet length may be converted into a complete representation system with taking a predetermined offset as a law for preventing them from generating continuous "0".

According to the second aspect of the present invention, a network system comprises:

a transmitting portion transmitting a plurality of packets with multiplexing, which header in each packet includes a first field holding a signal indicative of a packet length, a second field holding a signal indicative of a preferential order upon transferring the packet, a third field holding a signal indicative of a kind of traffic, a fourth field holding a signal indicative of a header length, a fifth field holding a control signal depending upon the kind of traffic, and a sixth field holding a signal indicative of a result of CRC operation of the header, a payload holding information signal depending upon kind of the traffic and a signal indicative of a result of CRC operation of the payload;

a relay node outputting the packet to an output path depending upon the destination address or a label added to the packet received from the transmitting portion; and a receiving portion separating the packet received from the relay node and inputting to a switching equipment, an asynchronous transmission mode switch or internet protocol router after performing a predetermined speed changing process.

In an exemplary embodiment, the traffic is one or more kinds among a synchronous transmission mode (STM), asynchronous transmission mode (ATM) and an internet protocol (IP). The payload may have a maximum length and a variable length.

The fifth field may include a field holding a signal indicative of a destination address, a field holding a signal indicative of a sender address, a field holding a remote alarm indicative of an alarm condition in a remote station, and a field holding a remote monitor indicative of a signal receiving condition of the remote station, and the header forms a header of the packet for transmitting a synchronous transmission mode signal.

In the alternative, the fifth field may include a field holding a signal indicative of a destination address, a field holding a signal indicative of a sender address and a field reserved for future use, and the header is a header of the packet for transmission of an asynchronous transmission mode cell.

In the further alternative, the fifth field may include a field holding a signal indicative of a label and a field reserved for future use, and the header is a header for transmitting the packet according to IPv4 or IPv6 using a label technology.

In a still further alternative, the fifth field may include a field holding a signal indicative of a destination address and a field holding a route information and an identifier for controlling traffic class and flow spreading, and the header is a header for transmitting the packet according to IPv4 or IPv6 using an address in network.

In either case, the header may further include a extendable field by option following the sixth field.

The multiplexed packet may further include an OAM packet used for maintenance of a network and management of operation, and stuff bytes for maintaining a period of the multiplexed packet. The OAM packet may include a field holding a byte for automatic protection switch, a field holding an order wire, a field of holding a data communication channel, a field holding a remote alarm indicative of alarm condition in the remote station, and a field holding a remote monitor indicative of the signal receiving condition in the remote station.

The stuff byte and the first field holding the signal indicative of the packet length may be converted into a complete representation system with taking a predetermined offset as a law for preventing them from generating continuous "O".

The multiplexed packet may further include an OAM packet used for maintenance of the network and management of operation, and stuff bytes for maintaining a period of the multiplexed packet.

In a preferred construction, the transmitting portion may comprise:
  (a) a switching equipment comprising a digital subscriber transporting device, a local switching equipment or a tandem switching equipment, a signal processing portion processing a synchronous transmission mode signal output from the switching equipment, a synchronous transmission mode processing portion recognizing a leading position of the synchronous transmission mode signal and a data length, a first FIFO storing an output of the signal processing portion, a second FIFO storing an output of the synchronous transmission mode processing portion, a first packet composing portion input an output of the first FIFO and a second packet composing portion input an output of the FIFO;
  (b) an asynchronous transmission mode switch, an asynchronous transmission mode cell order controlling portion input an asynchronous transmission mode cell output from the asynchronous transmission mode switch, a third FIFO storing an output of the asynchronous transmission mode cell order controlling portion and a third packet composing portion input an output of the third FIFO;
  (c) an internet protocol router, an internet protocol preference control portion input an internet protocol packet data output from the internet protocol router, a fourth FIFO storing an output of the internet protocol preference control portion and a fourth packet composing portion input an output of the fourth FIFO; and
  (d) a packet multiplexing portion multiplexing outputs of the first, second, third and fourth packet composing portions, a stuff byte generating portion generating a predetermined stuff byte for outputting, and an OAM packet generating portion generating an OAM packet for outputting.

The relay node may comprise a packet synchronization circuit establishing synchronization of the packet using the result of CRC operation of the header included in the packet per input path and the stuff byte, a physical phase/data integrated switch determining an output path of each packet with reference to the destination address or label in the header of the packet, and a packet frame forming portion for re-forming a frame of the packet using the stuff byte. The packet synchronization circuit may use $X^{16}+X^{12}+X^{5}+1$ as generating polygonal expression in the CRC operation of the header. The packet synchronization circuit may establishes synchronization using the stuff byte.

The receiving portion may comprise:
  (a) a packet demultiplexing portion separating received packets and an OAM packet detecting portion for detecting the OAM packet;
  (b) a first packet decomposing portion processing a signaling packet in synchronous transmission mode input from the packet demultiplexing portion for generating and outputting data, clock and a primitive, a first speed changing portion generating an original clock in the sender on the basis of a received clock, a second packet decomposing portion processing the packet in synchronous transmission mode input from the packet demultiplexing portion for generating and outputting data, clock and a primitive, a second speed changing portion generating an original clock in the sender on the basis of a received clock, a switching equipment constituted of the digital subscriber transporting device, local switching equipment or a tandem switching equipment and receiving an outputs of the first and second speed changing portions;
  (c) a third packet decomposing portion processing a signaling packet in asynchronous transmission mode input from the packet demultiplexing portion for generating and outputting data and clock, a third speed changing portion generating an original clock in the sender on the basis of a received clock, and the asynchronous transmission mode switch receiving an outputs of the third speed changing portion; and
  (d) a fourth packet decomposing portion processing a signaling packet in internet protocol input from the packet demultiplexing portion for generating and outputting data and clock, a fourth speed changing portion generating an original clock in the sender on the basis of a received clock, and the internet protocol router receiving an outputs of the fourth speed changing portion.

The speed changing portion may comprise a buffer memory storing the clock output from the packet decomposing portion and a PLL extracting an average frequency of the clock before being stored in the buffer memory for reading out the clock stored in the buffer memory according to the clock of the average frequency.

BRIEF DESCRIPTION OF THE DRAWINGS

The present invention will be understood more fully from the detailed description given herebelow and from the accompanying drawings of an exemplary embodiment of the present invention, which, however, should not be taken to be limited to the invention, but are for explanation and understanding only.

In the drawings.

DESCRIPTION OF THE PREFERRED EMBODIMENT

The present invention will be discussed hereinafter in detail in terms of an exemplary embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessarily obscuring the description of the present invention.

[Frame Structure]

Figure 1:
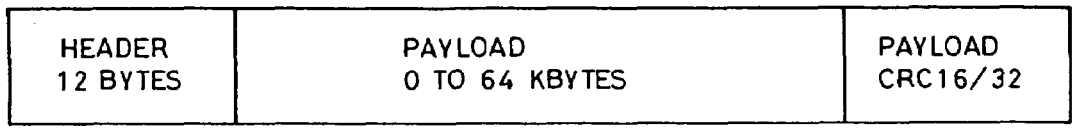
FIG. 1 is an explanatory illustration showing one embodiment of a frame structure (base frame) according to the present invention.

FIG. 1 is an explanatory illustration showing one embodiment of the present invention. As shown in FIG. 1, a basic frame structure includes a header (12 bytes (which can be extended up to 44 bytes as option), a payload (0 to 64 Kbytes) and a result of an arithmetic operation of a payload of Cyclic Redundancy Check (CRC) 16 or CRC 32. In the payload portion, voice 64 Kbps×n (STN), a plurality of ATM having the same VPI (Virtual Path Identifier) and IP packet divided per destinations are accommodated as respective independent packets.

Figure 2:
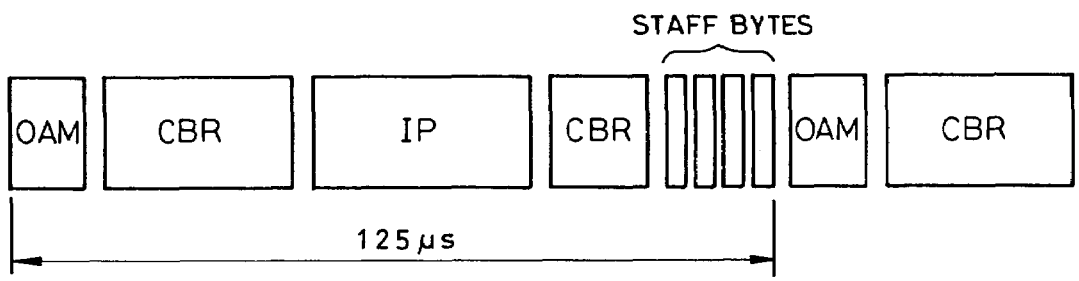
FIG. 2 is an explanatory illustration showing packet arrangement.

FIG. 2 is an explanatory illustration showing a condition where a plurality of packets shown in FIG. 1 are accommodated. The packets are accommodated by taking 125 μs as one period. In the shown packet arrangement, STM is given the highest preferential order to accommodate. Then, ATM is accommodated and given the second highest preferential order. Then, the IP packet given the lowest preferential order is accommodated in a remaining space. In order to keep 125 μs or to establish bit synchronization, a necessary number of stuff bytes of 2 byte length are added. Furthermore, as used in Wavelength Division Multiplexing (WDM), an operation administration and maintenance (OAM) packet is inserted in 125 μs period as an option. It should be noted that, in the drawings, CBR represents a packet accommodating the STM or ATM and IP represents the IP packet.

Next, discussion will be given for a header structure for a respective communication mode.

Figure 3:
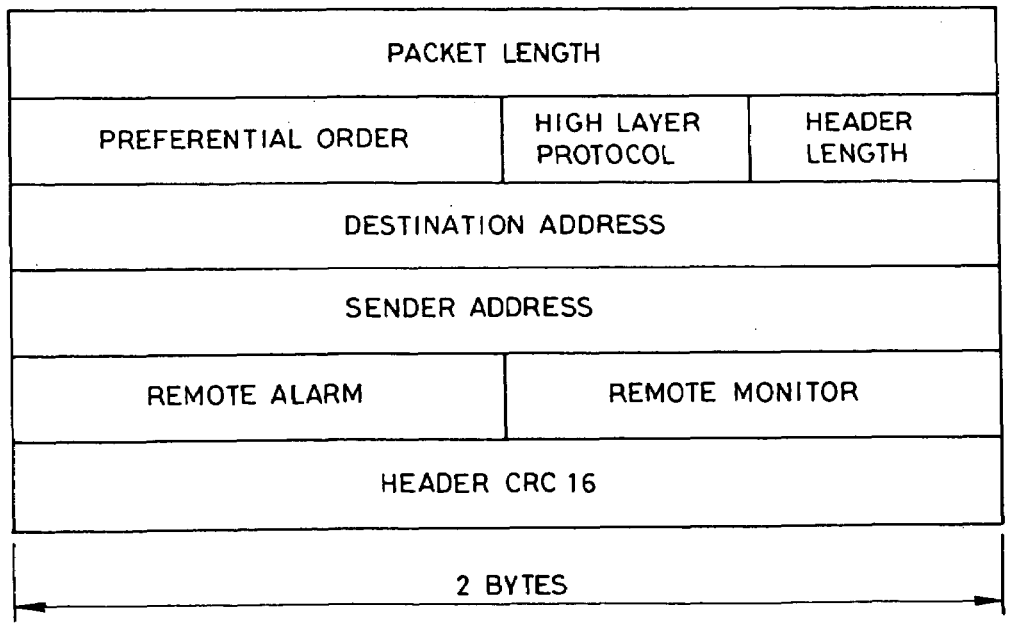
FIG. 3 is an explanatory illustration showing a header structure in case of STM.

FIG. 3 is an explanatory illustration of the header structure in the case of STM. In the case of STM, the packet length indicative of an entire length of the packet is 2 bytes, a preference indicative of the preferential order of the packet is 1 byte, a high layer protocol as an identifier identifying a signal mounted on the payload is 4 bits, a header length indicative of length of the header is 4 bits, a destination address of the destination is 2 bytes, a sender address is 2 bytes, 1 byte of remote alarm indicative of alarm condition of remote station is added and 2 bytes of header CRC 16 transferring result of arithmetic operation by the CRC 16 of the header, finally to form the header. It should be noted that the header length is 0 to $F_{hex}$ ($X_{hex}$ represents that is a hexa-decimal number) and can be added after CRC 16 up to 32 bytes taking 2 bytes as basic unit.

Figure 4:
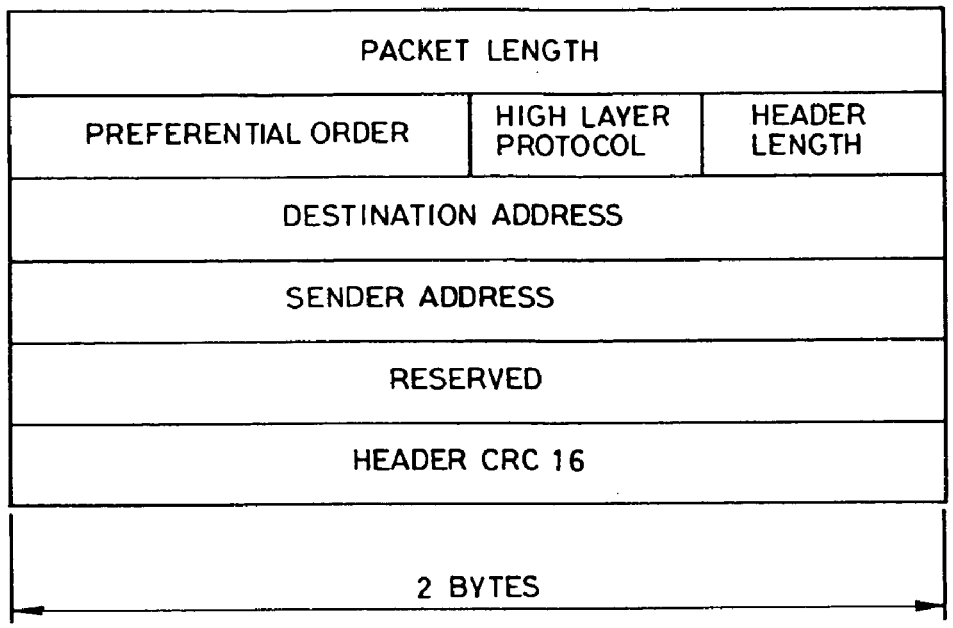
FIG. 4 is an explanatory illustration showing a header structure in case of ATM.

FIG. 4 is an explanatory illustration of the header structure in the case of ATM. In the case of ATM, the packet length indicative of an entire length of the packet is 2 bytes, a preference indicative of the preferential order of the packet is 1 byte, a high layer protocol as an identifier identifying a signal mounted on the payload is 4 bits, a header length indicative of length of the header is 4 bits, a destination address of the destination is 4 bytes, 2 bytes of a reserved byte reserved for use in the future is added and 2 bytes of header CRC 16 transferring results of arithmetic operation by the CRC 16 of the header, finally to form the header. It should be noted that the header length is 0 to $F_{hex}$ and can be added after CRC 16 up to 32 bytes taking 2 bytes as basic unit.

Figure 5:
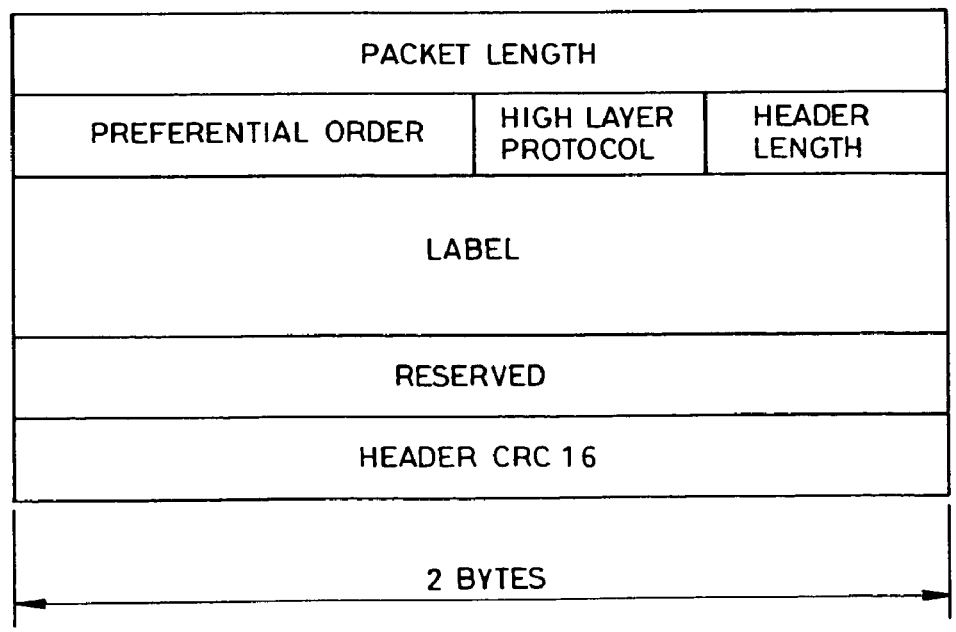
FIG. 5 is an explanatory illustration showing a structure of the header in case of IPv4, v6 to be transferred using label technology.

FIG. 5 is an explanatory illustration of the header structure in the case of IPv4 and v6 for transferring using a label technology. In the case of IPv4, v6 transferring using the label technology, the packet length indicative of an entire length of the packet is 2 bytes, a preference indicative of the preferential order of the packet is 1 byte, a high layer protocol as an identifier identifying a signal mounted on the payload is 4 bits, a header length indicative of length of the header is 4 bits, a label for indicating route traffic class as route information of the packet and flow spreading is 4 bytes, 2 bytes of a reserved byte reserved for used in the future is added and 2 bytes of header CRC 16 transferring result of arithmetic operation by the CRC 16 of the header, finally to form the header. It should be noted that header length is 0 to $F_{hex}$ and can be added after CRC 16 up to 32 bytes taking 2 bytes as basic unit. On the other hand, when the traffic to be transferred is IP, lower two bits of the high layer protocol is used. When the packet includes over 125 μs, the packet is transferred as being divided into an arbitrary length of packets.

Figure 6:
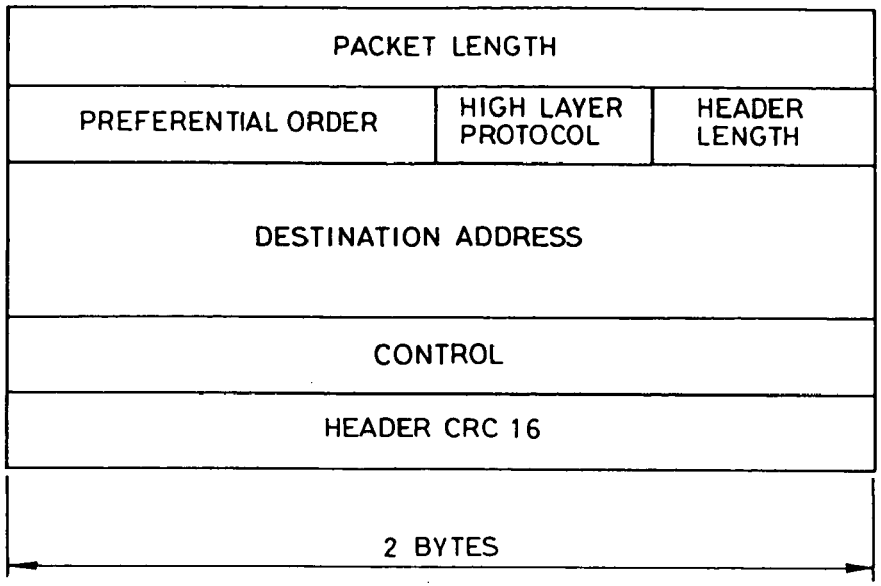
FIG. 6 is an explanatory illustration showing a structure of the header in case of IPv4, v6 transferring using an address in a network.
Figure 7:
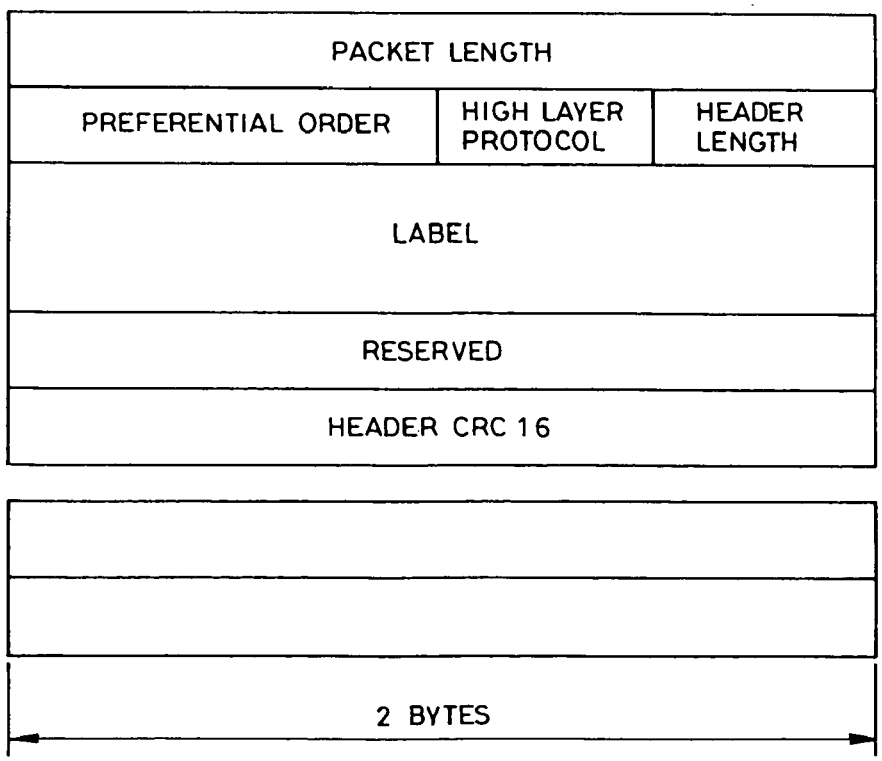
FIG. 7 is an explanatory illustration showing a header extension.

FIG. 6 is an explanatory illustration showing a header structure in the case of IP4v, 6transferring using the address in the network. In the case of transferring IP4v, 6v using the address in the network, the packet length indicative of entire length of the packet is 2 bytes, a preference indicative of the preferential order of the packet is 1 byte, a high layer protocol as an identifier identifying a signal mounted on the payload is 4 bits, a header length indicative of length of the header is 4 bits, a destination address as recipient address is 4 bytes, 1 byte of identifier for identification of traffic class and flow spreading, and finally, and 2 bytes of header CRC 16 transferring result of arithmetic operation by the CRC 16 of the header, finally to form the header. It should be noted that the header length is 0 to $F_{hex}$ ($X_{hex}$ represents that is a hexa-decimal number) and can be added after CRC 16 up to 32 bytes taking 2 bytes as basic unit. The extended condition of the header is shown in FIG. 7. When the traffic to be transferred is IP, a lower 2 bits of the high layer protocol is used. When the packet includes over 125 μs, the packet is transferred as being divided into an arbitrary length of packets.

Figures 8, 9:
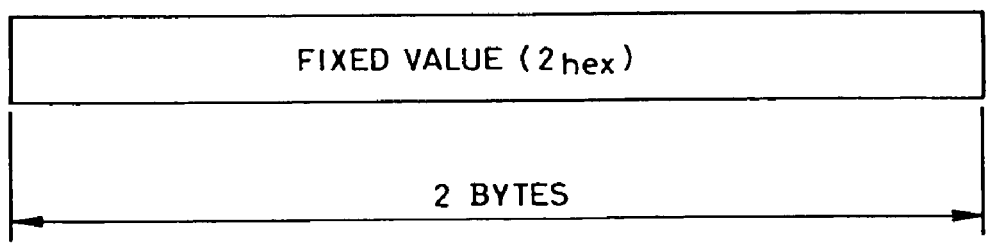
FIG. 8 is an explanatory illustration showing a structure of an OAM packet.
FIG. 9 is an explanatory illustration showing a structure of a stuff byte.

FIG. 8 is an explanatory illustration showing a header structure in the case of an OAM packet. In the OAM packet to be transferred using the address in the network, the packet of packet length $C_{hex}$ is generated per 125 μs. The packet includes K1, K2 bytes for automatic protection switching (APS) and respective bytes of an order wire, DCC (Data Communication Channel: DCC)1, DCC2 and DCC3, remote alarm, remote monitor, and a result of an arithmetic operation of CRC16 of the header, finally.

FIG. 9 is an illustration showing a stuff byte. As shown in FIG. 9, the stuff byte is a packet of 2 bytes. A code to be added to the packet adds an appropriate offset for $2_{hex}$ to avoid occurrence of continuous "0". On the other hand, the header length of each packet is adjusted by an offset value. Namely, the stuff byte and the field holding the signal indicative of the packet length are converted into a complete representation system by taking a predetermined offset as a law.

[Network System]

Next, discussion will be given for a transmitting portion, a relay node and a receiving portion forming the shown embodiment of the network system.

Figure 10:
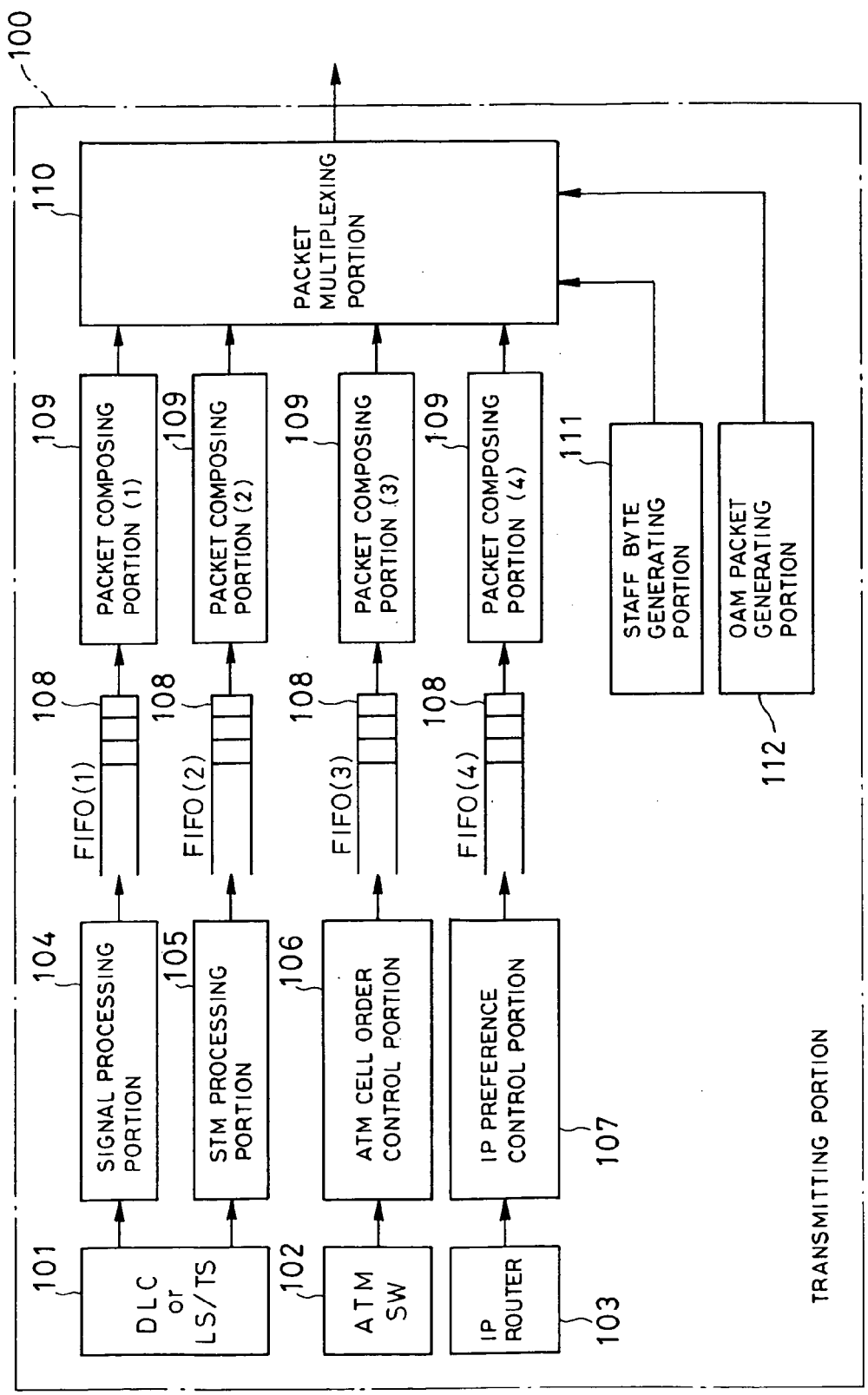
FIG. 10 is a block diagram showing a construction of a transmitting portion.

FIG. 10 is a block diagram showing the transmitting portion. The transmitting portion 100 has switching equipment 101, an ATM switch 102, an IP router 103, a signal processing portion 104, an ATM processing portion 105, an ATM cell order control portion 106, an IP preference control portion 107, an FIFO 108, a packet composing portion 109, a packet multiplexing portion 110, a stuff byte generating portion 111 and an OAM packet generating portion 112.

Figure 11:
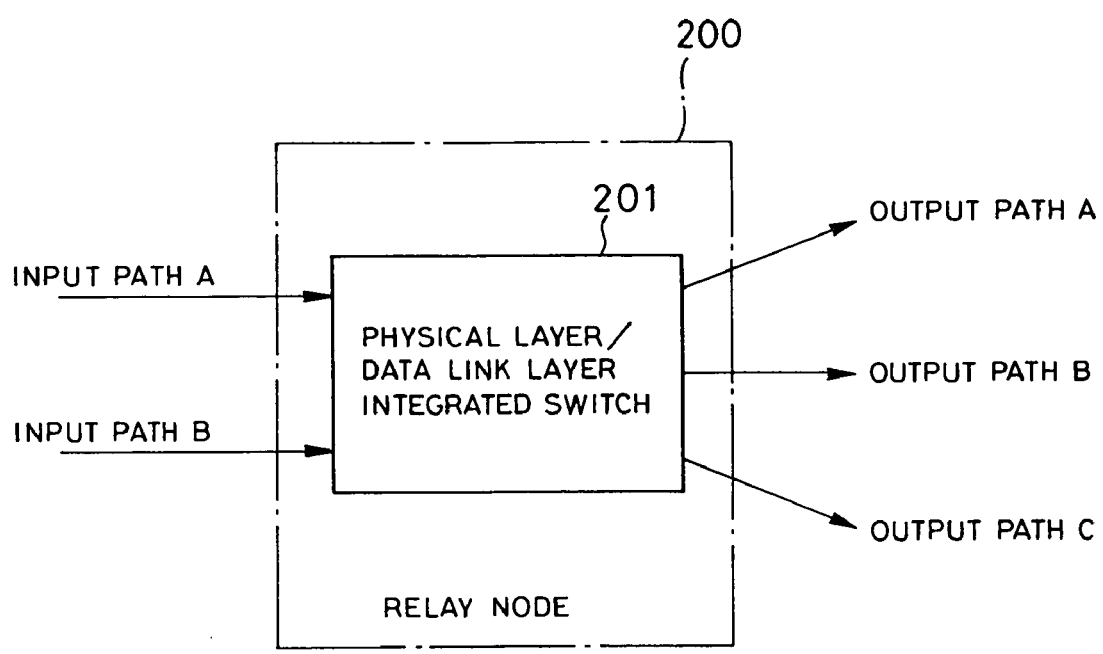
FIG. 11 is a block diagram showing a construction of a relay node.
Figure 12:
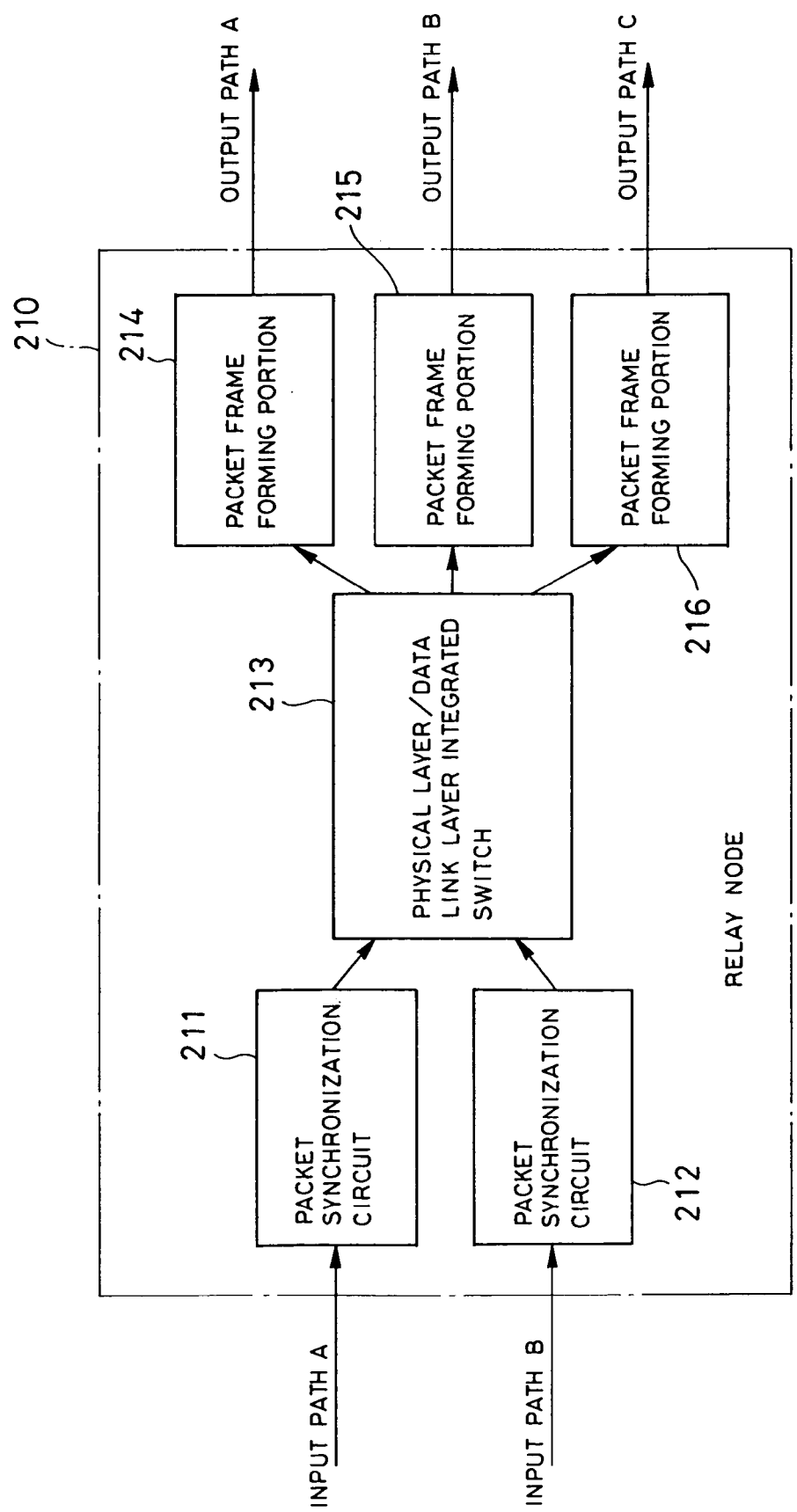
FIG. 12 is a block diagram showing a construction of a relay node.

FIG. 11 is a block diagram showing a relay node. In FIG. 11, the relay node 200 has a physical layer/data link layer integrated switch 201 connected to input lines A and B and output lines A, B and C. The detail of the relay node 200 is as shown in FIG. 12. The relay node 210 includes packet synchronization circuits 211 and 212 for establishing packet synchronization by byte synchronization of arithmetic operation of CRC 16 of the header contained in the data packet of each input line and stuffing byte, the physical layer/data link layer integrated switch 213 determining a route to destination per packet, and packet frame establishing portion 214 to 216 for re-establishing a packet frame by packet stuffing using the packet stuff byte for transferring packet to the output line.

Figure 13:
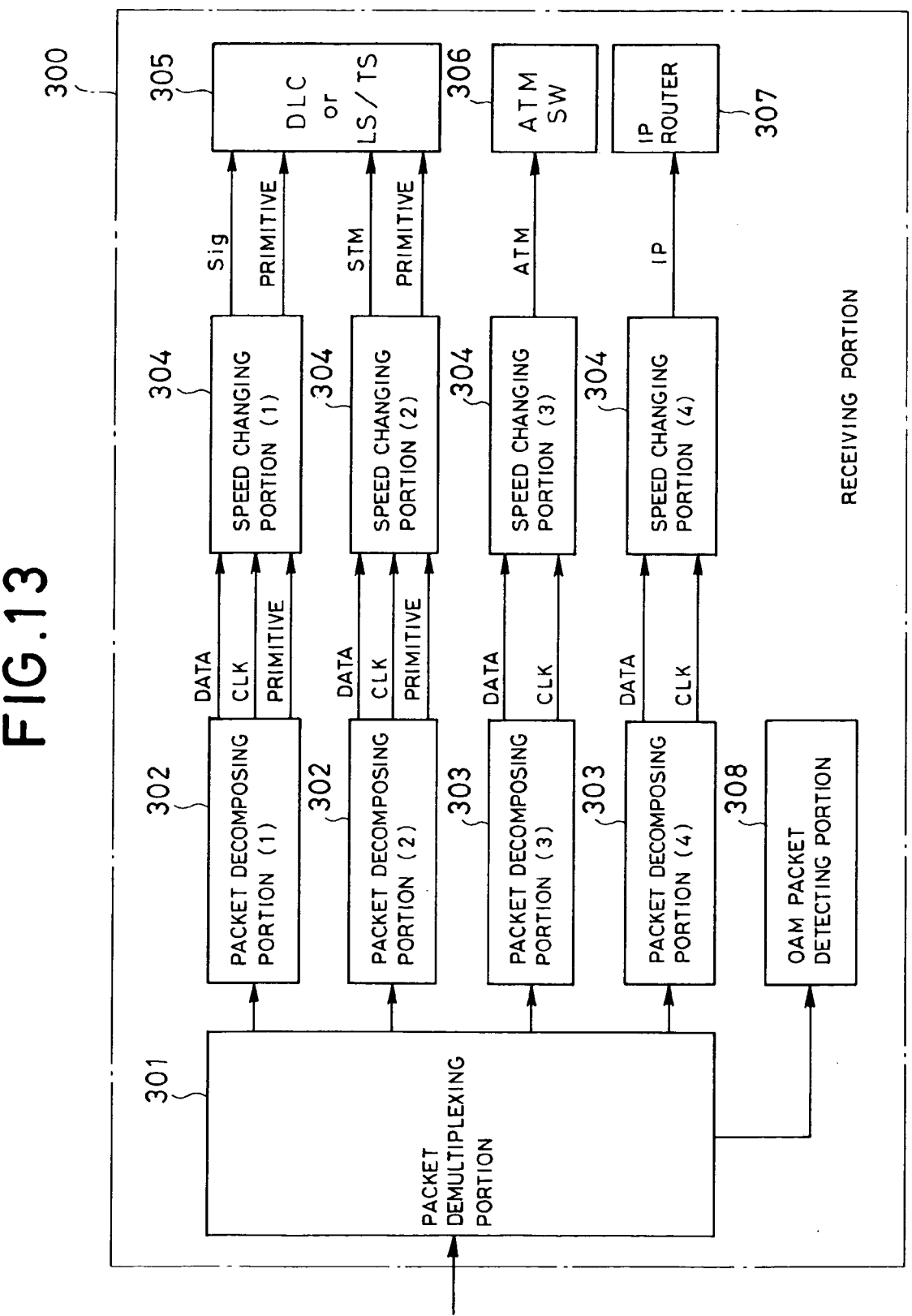
FIG. 13 is a block diagram showing a construction of a receiving portion.

FIG. 13 is a block diagram showing a receiving portion. As shown in FIG. 13, the receiving portion 300 has a packet demultiplexing portion 301, a packet decomposing portion 302 and 303, a speed changing portion 304, a switching equipment 305, an ATM switch 306, an IP router 307 and an OAM packet detecting portion 308.

Figure 14:
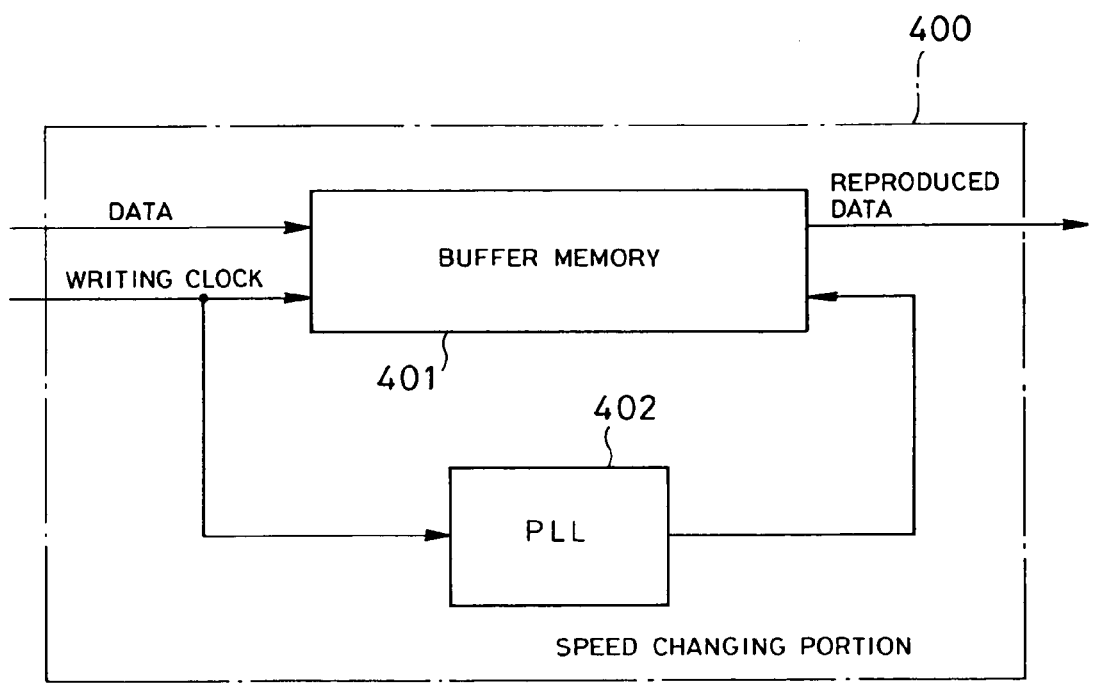
FIG. 14 is a block diagram showing a construction of a speed changing portion.

FIG. 14 is a block diagram showing a construction of the speed changing portion reproducing an original data string. In FIG. 14, the speed changing portion 400 includes a buffer memory 401 and a PLL 402. Accordingly, data extracted by the packet decomposing portion 302 is written in the buffer memory 401 by a clock (hereinafter referred to as writing clock) generated by the packet decomposing portion 302. On the other hand, the writing clock is written in the PLL 402 to be extracted an average frequency. By the clock, data is read out from the buffer memory 401 to reproduce the original data string.

A signaling and STM signal reproduced by the speed changing portions (1) and (2) are fed to DLC, LS or TS to be subject to a switching process. The ATM cell reproduced by the speed changing portion (3) is transferred to an ATM switch to be subject to cell switching process. The IP data reproduced by the speed switching portion (4) is transmitted to the IP router to be subject to a process by the internet protocol.

In the OAM packet detecting portion 308, an OAM packet is terminated and K1, K2 byte, order wire, data communication channel and remote alarm and remote monitor are respectively terminated and appropriately processed.

[Operation of Transmitting Portion and Receiving Portion]

Next, discussion will be given for transmitting portion 100. In composing of the STM packet, a data string and signal information of 64 kbps×consisted of 8 bits/125 μs per one voice channel identified per destination are transmitted to the STM processing portion 105 and the signal processing portion 104. In the STM processing portion 104, a leading position and data length of the STM signal aligned per byte are identified. The output signal from the STM processing portion 105 is temporarily stored in FIFO (2) per 125 μs. In the signal processing portion 104, the signaling information per byte of STM are composed into an appropriate length of data string, and the length thereof is measured. The data output from the signal processing portion 104 is temporarily stored in FIFO (1).

In composing of the ATM packet, the ATM cell is input to the ATM cell order control portion 106 from the ATM switch 102, the same VPI packet data per a unit of 125 μs are re-arranged in order measure length of a group of cells having the same VPI. The output of the ATM cell order control portion 106 is temporarily stored in FIFO (3).

In composing of the IP packet, the IP packet data transmitted from the IP router 103 is input to the IP preference control portion 107 for recognizing preference of the IP packet data. The IP packet data of the same destination at the same preference are concentrated, recognized and output in preferential order to be temporarily stored in the FIFO (4). It should be noted that the IP packets as an option are composed alone, respectively.

In composing of the packet composing portion (1), respective counterparts to exchanging signaling are added per respective signal information and composed in the header together with the own address. In the header, (header length plus data length) is composed at the leading end.

Then, each packet is composed. In the preference field of the header in the signaling packet, indication of the highest preferential order is added. On the other hand, as the high layer protocol, an identifier of STM signaling is added. On the other hand, normally, $O_{hex}$ is used as the header length. Furthermore, for the composed header, arithmetic operation of CRC 16 for the header is performed to add the result of arithmetic operation at the tail end thereof. Following the header, data, namely a payload is composed. Furthermore, as an option, the result of an arithmetic operation of CRC 16 or CRC 32 is added.

In packet composing portion (2), a destination to exchange voice signal is added to each voice data string to be composed in the header together with the own address. In the header, (header length plus data length) is composed at the leading end. Then, each packet is formed. In the preference field of the header of the STM packet, the fact that preferential order is high, is indicated. As a high layer protocol, the identifier of the STM is added. On the other hand, as the header length in a normal case, $O_{hex}$ is used. On the other hand, an alarm condition of receiving a condition of the packet transmitted from the remote station is set in the remote alarm field, and a result of monitoring of line condition, such as an error in transmission line, is set in the remote monitor field. Furthermore, for the composed header, arithmetic operation of CRC 16 is performed with respect to the composed header. Then, the result of the arithmetic operation is added to the tail end of the header. Following the header, data, namely, a payload is composed. Furthermore, as an option, the result of an arithmetic operation of CRC 16 or CRC 32 is added as option.

In the packet composing portion (3), a destination to be exchanged per group of the cells of the same VPI is added per group of the cell to compose in the header together with the own address. In the header, (header length+data length) is composed at the leading end. Then, each packet is formed. In the preference field of the header of the ATM packet, an order of the preference is added in order of CBR, then UBR+. As a high layer protocol, the identifier of the ATM is added. On the other hand, as the header length in normal case, $O_{hex}$ is used. On the other hand, the reserved field for use in the future is added. Furthermore, for the composed header, arithmetic operation of CRC 16 is performed with respect to the composed header. Then, the result of the arithmetic operation is added to the tail end of the header. Following the header, data, namely, a payload is composed. Furthermore, as an option, the result of an arithmetic operation of CRC 16 or CRC 32 is added as option.

In the packet composing portion (4), the route, traffic class and flow spreading information are added as the label per each IP data packet. In the header, (header length plus data length) is composed at the leading end. Then, each packet is formed. In the preference field of the header of the IP packet, the determined preferential order is added. As high layer protocol, the identifier of the IP is added. On the other hand, as the header length in normal case, $O_{hex}$ is used. Then, the result of the arithmetic operation is added to the tail end of the header. Following the header, data, namely, a payload is composed. Furthermore, as an option, the result of an arithmetic operation of CRC 16 or CRC 32 is added as option.

On the other hand, as used in WDM, the OAM packet generating portion is added as an option. In the OAM packet generating portion, the packet having packet length $c_{hex}$ is generated at every 125 µs. The packet includes respective bytes of K1, K2 bytes for automatic protection switch, order wire, data communication channels DCC1, DCC2 and DCC 3 and remote alarm and remote monitor notifying to the remote station the receiving condition of the OAM packet transmitted from the remote station, and the result of arithmetic operation of the CRC 16 is added at the tail end of the header.

Furthermore, in the stuff byte generating portion 111, the packet for stuff of 2 byte length is generated. The code to be added to the packet is added an appropriate offset to $2_{hex}$ for avoiding occurrence of continuous "0". Namely, the stuff byte and the field holding the signal indicative of the packet length are converted into a complete representation system with taking a predetermined offset as a law.

Finally, in the packet multiplexing portion 110, the packets which are composed in the packet composing portion taking the OAM packet at the leading end when the OAM packet is used, and taking the STM packet at the leading end when the OAM packet is not used, are multiplexed. At this time, when empty space is present after multiplexing, since bit synchronization is established by only composed packet strings, stuff bytes are filled in the extent of empty space. It should be noted that since the stuff byte is 2 bytes, the leading packet to be a reference of 125 µs may fluctuate for 2 bytes in the worst case. In the packet multiplexing portion, the multiplexed output is handled as 0ch path of the WDM or the path of the SONET/SDH.

Next, discussion will be given for the operation of the relay node. In the relay node 210, packet synchronization is established by the arithmetic operation of CRC 16 of the header and byte synchronization of the stuffing byte included in the data and packet. Next, by checking the destination address or label field included in the header of the packet, transfer route is determined per packet. Then, the packet is transferred to the output route. At this time, when the STM packet passes, a return path having the same capacity as the selected route is established.

Next, discussion will be given for the receiving portion. In the packet demultiplexing portion 301, bit synchronization and packet synchronization (frame synchronization) is established by the header and the stuffing bytes of each packet. Packet synchronization is judged by a check result of CRC 16 of the header. If the check result of CRC 16 of the header is 0, judgment is made that packet synchronization is established. Depending upon the header length, end of the packet is judged. Subsequently, a check of the CRC 16 included in the header of the next packet is performed.

On the other hand, the stuff byte is verified a pattern by a synchronization circuit having a unique pattern for checking synchronization per 2 bytes. Thus, packet synchronization is established. When packet synchronization is established in the packet demultiplexing portion, the high layer protocol in the header is made reference to discriminate data between signaling of STM, STM, ATM or IP.

On the other hand, reference is made to the header length to check whether additional information of the header is present or not. Then, an entire packet is comprehended by the packet length and boundary of the payload portion is recognized. In the case of the signaling packet of STM, the packet is transferred to the packet decomposing portion (1). In the case of the STM packet, the packet is transferred to the packet decomposing portion (2). In the case of the ATM packet, the packet is transferred to the packet decomposing portion (3). In the case of the IP packet, the packet is transferred to the packet decomposing portion (4). On the other hand, in the case of the OAM packet, the packet is transferred to the OAN packet detecting portion 308.

In the packet decomposing portion (1), the signaling packet of STM is processed, CRC 16 or CRC 32 of the payload is calculated to generate data, clock and primitive. Data includes a portion where the header and the CRC check byte of the payload are removed. The clock is corresponded on a one to one basis to data for taking timing of data. In the primitive, information of a sender is included.

In the packet decomposing portion (2), the STM packet is processed, CRC 16 or CRC 32 of the payload is calculated to generate data, clock and primitive. Data includes a portion where the header and the CRC check byte of the payload are removed. The clock is corresponded on a one to one basis to data for taking timing of data. In the primitive, information of a sender is included.

In the packet decomposing portion (3), the ATM packet is processed, and CRC 16 or CRC 32 of the payload is calculated to generate data and clock. Data includes a portion where the header and the CRC check byte of the payload are removed. The clock is corresponded on a one to one basis to data for taking timing of data.

In the packet decomposing portion (4), the IP packet is processed, and CRC 16 or CRC 32 of the payload is calculated to generate data and clock. Data includes a portion where the header and the CRC check byte of the payload are removed. The clock is corresponded on a one to one basis to data for taking timing of data.

Next, in the speed changing portion (1), the original signal of the sender is reproduced by smoothing the clock by PLL or the like.

In the speed changing portion (2), the original signal of the sender is reproduced by smoothing the clock by PLL or the like.

In the speed changing portion (3), the original signal of the sender is reproduced by smoothing the clock by PLL or the like.

In the speed changing portion (4), the original signal of the sender is reproduced by smoothing the clock by PLL or the like. The basic construction of the speed changing portion is constructed with the buffer memory. The data extracted by the packet decomposing portion is written in the buffer memory 40 by the clock (hereinafter referred to as writing clock) generated by the packet decomposing portion 302. On the other hand, the writing clock is written in PLL 402 to be extracted by an average frequency. By reading out data from the buffer memory by the clock, the original data string is reproduced.

Next, discussion will be given for arithmetic operation of CRC 16 of the header. Generated polygonal expression of CRC 16 is $X^{16}+X^{12}+X^5+1$. Data to be object for arithmetic operation of CRC becomes 8×10=80 bits. Here, considering a unit matrix of 80 rows× 80 columns, $X^{16}$ is multiplied per row and is subtracted from the generated polygonal expression to derive a remainder. The remainder, namely a transposed matrix of a matrix of 80 rows×16 columns is taken, the resultant value is expressed as [P]. To this transposed matrix, a column vector [A] consisted objection is multiplied. At this time, in calculation of sum of products of this matrix, mod2 operation is performed to derive the result of arithmetic operation of CRC 16. This value is added as header CRC 16.

In the packet synchronization circuits 211 and 212, for the foregoing transposed matrix [P], a [PI] matrix is generated, taking 16 rows×16 columns as a unit matrix. To this matrix, a column vector [B] including header 96 code is multiplied. At this time, in operation of sum of products of the matrix, mod2 operation is performed. Then, when all results become 0, judgment is made that the header is detected, and a count is performed for the packet length indicated by the most significant 16 bits. Then, CRC operation is performed in similar manner as the next header. When synchronization is not established, memory of 96 bits is prepared for performing the foregoing operation per 1 bit shift to continue shifting until the result of operation becomes 0. When the result of operation becomes 0, it is regarded that hunting ends to enter into a synchronization protection mode. When the result of CRC operation of the header becomes 0 for designated times, judgment is made that synchronization is established. On the other hand, when error is caused for a designated times even when CRC operation is continued, synchronization failure is judged. Here, stuff byte performing detection of matching of 2 bytes in another synchronization circuit to performing assisting of establishment of synchronization.

As set forth above, the present invention comprises transmitting a plurality of packets in a multiplexing manner, which header in each packet includes a first field holding a signal indicative of a packet length, a second field holding a signal indicative of a preferential order upon transferring the packet, a third field holding a signal indicative of a kind of traffic, a fourth field holding a signal indicative of a header length, a fifth field holding a control signal depending upon the kind of traffic, and a sixth field holding a signal indicative of a result of CRC operation of the header, a payload holding an information signal depending upon a kind of the traffic and a signal indicative of a result of CRC operation of the payload.

Accordingly, by inserting the stuff byte using the frame structure integrated therein the physical layer and the data layer, a frame of 125 $\mu s$ period can be formed, and in conjunction therewith, bit synchronization of the physical phase can be established. Furthermore, since this frame may provide a common frame structure for the synchronous transmission mode, asynchronous transmission mode and internet protocol, different kinds of information can be simultaneously handled in the common network in a common method. Particularly, in the relay node, since the bit synchronization and the packet synchronization can be established by the header of the packet and the stuff byte to output the synchronous transmission mode, the asynchronous transmission mode and the internet protocol to the designated path using the common physical layer/digital link layer integration switch, to integrate the synchronous transmission mode network, the asynchronous transmission mode network and the internet protocol network which are established separately, can be united into a common single network.

Although the present invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above, but to include all possible embodiments which can be embodied within a scope encompassed and equivalents thereof with respect to the feature set out in the appended claims.

What is claimed is:

1. A transmission method comprising:
    transmitting a plurality of packets in multiplexing manner, wherein a header in each packet includes a first field holding a signal indicative of a packet length, a second field holding a signal indicative of a preferential order upon transferring the packet, a third field holding a signal indicative of a kind of traffic, a fourth field holding a signal indicative of a header length, a fifth field holding a control signal depending upon the kind of traffic, and a sixth field holding a signal indicative of a result of CRC operation of the header, and a payload of the packets holds an information signal depending upon kind of the traffic and a signal indicative of a result of CRC operation of the payload, said header included in at least a data link layer.

2. A transmission method as set forth in claim 1, wherein said traffic is one or more kinds among a synchronous transmission mode, asynchronous transmission mode and an internet protocol.

3. A transmission method as set forth in claim 1, wherein said payload has a maximum length and a variable length.

4. A transmission method as set forth in claim 2, wherein said fifth field includes a field holding a signal indicative of a destination address, a field holding a signal indicative of a sender address, a field holding a remote alarm indicative of an alarm condition in a remote station, and a field holding a remote monitor indicative of a signal receiving condition of the remote station, and said header forms a header of the packet for transmitting a synchronous transmission mode signal.

5. A transmission method as set forth in claim 2, wherein said fifth field includes a field holding a signal indicative of a destination address, a field holding a signal indicative of a sender address and a field reserved for future use, and said header is a header of the packet for transmission of an asynchronous transmission mode cell.

6. A transmission method as set forth in claim 2, wherein said fifth field includes a field holding a signal indicative of a label and a field reserved for future use, and said header is a header for transmitting the packet according to IPv4 or IPv6 using a label technology.

7. A transmission method as set forth in claim 2, wherein said fifth field includes a field holding a signal indicative of a destination address and a field holding a route information and an identifier for controlling traffic class and flow spreading, and said header is a header for transmitting the packet according to IPv4 or IPv6 using an address in a network.

8. A transmission method as set forth in claim 4, wherein said header further includes an extendable field by option following said sixth field.

9. A transmission method as set forth in claim 1 wherein said multiplexed packet further includes an OAM packet used for maintenance of a network and management of operation, and stuff bytes for maintaining a period of the multiplexed packet.

10. A transmission method as set forth in claim 9, wherein said OAM packet includes a field holding a byte for automatic protection switch, a field holding an order wire, a field of holding a data communication channel, a first holding a remote alarm indicative of alarm condition in the remote station, and a field holding a remote monitor indicative of the signal receiving condition in the remote station.

11. A transmission method as set forth in claim 9, wherein said stuff byte and said first field holding the signal indicative of the packet length are converted into a complete representation system with taking a predetermined offset as a law for preventing them from generating continuous "0".

12. A network system comprising:
a transmitting portion transmitting a plurality of packets with multiplexing, wherein a header in each packet includes a first field holding a signal indicative of a packet length, a second field holding a signal indicative of a preferential order upon transferring the packet, a third field holding a signal indicative of a kind of traffic, a fourth field holding a signal indicative of a header length, a fifth field holding a control signal depending upon the kind of traffic, and a sixth field holding a signal indicative of a result of CRC operation of the header, and a payload of the packets holds an information signal depending upon kind of the traffic and a signal indicative of a result of CRC operation of the payload, said header included in at least a data link layer;
a relay node outputting said packet to an output path depending upon the destination address or a label added to the packet received from said transmitting portion; and
a receiving portion separating said packet received from said relay node and inputting to a switching equipment, an asynchronous transmission mode switch or internet protocol router after performing a predetermined speed changing process.

13. A network system as set forth in claim 12, wherein said traffic is one or more kinds among a synchronous transmission mode, asynchronous transmission mode and an internet protocol.

14. A network system as set forth in claim 12, wherein said payload has a maximum length and a variable length.

15. A network system as set forth in claim 13, wherein said fifth field includes a field holding a signal indicative of a destination address, a field holding a signal indicative of a sender address, a field holding a remote alarm indicative of an alarm condition in a remote station, and a field holding a remote monitor indicative of a signal receiving condition of the remote station, and said header forms a header of the packet for transmitting a synchronous transmission mode signal.

16. A network system as set forth in claim 13, wherein said fifth field includes a field holding a signal indicative of a destination address, a field holding a signal indicative of a sender address and a field reserved for future use, and said header is a header of the packet for transmission of an asynchronous transmission mode cell.

17. A network system as set forth in claim 13, wherein said fifth field includes a field holding a signal indicative of a label and a field reserved for future use, and said header is a header for transmitting the packet according to IPv4 or IPv6 using a label technology.

18. A network system as set forth in claim 13, wherein said fifth field includes a field holding a signal indicative of a destination address and a field holding a route information and an identifier for controlling traffic class and flow spreading, and said header is a header for transmitting the packet according to IPv4 or IPv6 using an address in a network.

19. A network system as set forth in claim 15, wherein said header further includes an extendable field by option following said sixth field.

20. A network system as set forth in claim 13, wherein said multiplexed packet further includes an OAM packet used for maintenance of the network and management of operation, and stuff bytes for maintaining a period of the multiplexed packet.

21. A network system as set forth in claim 20, wherein said OAM packet includes a field holding a byte for automatic protection switch, a field holding an order wire, a field of holding a data communication channel, a first holding a remote alarm indicative of alarm condition in the remote station, and
a field holding a remote monitor indicative of the signal receiving condition in the remote station.

22. A network system as set forth in claim 20, wherein said stuff byte and said first field holding the signal indicative of the packet length are converted into a complete representation system with taking a predetermined offset as a law for preventing them from generating continuous "0".

23. A network system as set forth in claim 20, wherein said transmitting portion comprises:
   (a) a switching equipment comprising a digital subscriber transporting device, a local switching equipment or a tandem switching equipment, a signal processing portion processing a synchronous transmission mode signal output from said switching equipment, a synchronous transmission mode processing portion recognizing a leading position of said synchronous transmission mode signal and a data length, a first FIFO storing an output of said signal processing portion, a second FIFO storing an output of said synchronous transmission mode processing portion, a first packet composing portion input an output of said first FIFO and a second packet composing portion input an output of said FIFO;
   (b) an asynchronous transmission mode switch, an asynchronous transmission mode cell order controlling portion input an asynchronous transmission mode cell output from said asynchronous transmission mode switch, a third FIFO storing an output of said asynchronous transmission mode cell order controlling portion and a third packet composing portion input an output of said third FIFO;
   (c) an internet protocol router, an internet protocol preference control portion input an internet protocol packet data output from said internet protocol router, a fourth FIFO storing an output of said internet protocol preference control portion and a fourth packet composing portion input an output of said fourth FIFO; and
   (d) a packet multiplexing portion multiplexing outputs of said first, second, third and fourth packet composing portions, a stuff byte generating portion generating a predetermined stuff byte for outputting, and an OAM packet generating portion generating an OAM packet for outputting.

24. A network system as set forth in claim 20, wherein said relay node comprises a packet synchronization circuit establishing synchronization of the packet using the result of CRC operation of the header included in the packet per input path and the stuff byte, a physical phase/data integrated switch determining an output path of each packet with reference to the destination address or label in the header of the packet, and a packet frame forming portion for reforming a frame of said packet using the stuff byte.

25. A network system as set forth in claim 24, wherein said packet synchronization circuit uses $X^{16}+X^{12}+X^{5}+1$ as generating polygonal expression in said CRC operation of said header.

26. A network system as set forth in claim 24, wherein said packet synchronization circuit establishes synchronization using the stuff byte.

27. A network system as set forth in claim 20, wherein said receiving portion comprises:
   (a) a packet demultiplexing portion separating received packets and an OAM packet detecting portion for detecting the OAM packet;
   (b) a first packet decomposing portion processing a signaling packet in synchronous transmission mode input from the packet demultiplexing portion for generating and outputting data, clock and a primitive, a first speed changing portion generating an original clock in the sender on the basis of a received clock, a second packet decomposing portion processing the packet in synchronous transmission mode input from the packet demultiplexing portion for generating and outputting data, clock and a primitive, a second speed changing portion generating an original clock in the sender on the basis of a received clock, a switching equipment constituted of the digital subscriber transporting device, local switching equipment or a tandem switching equipment and receiving outputs of said first and second speed changing portions;
   (c) a third packet decomposing portion processing a signaling packet in asynchronous transmission mode input from the packet demultiplexing portion for generating and outputting data and clock, a third speed changing portion generating an original clock in the sender on the basis of a received clock, and the asynchronous transmission mode switch receiving outputs of said third speed changing portion; and
   (d) a fourth packet decomposing portion processing a signaling packet in internet protocol input from the packet demultiplexing portion for generating and outputting data and clock, a fourth speed changing portion generating an original clock in the sender on the basis of a received clock, and the internet protocol router receiving outputs of said fourth speed changing portion.

28. A network system as set forth in claim 27, wherein said speed changing portion comprises a buffer memory storing the clock output from the packet decomposing portion and a PLL extracting an average frequency of the clock before being stored in the buffer memory for reading out the clock stored in the buffer memory according to the clock of the average frequency.

29. A network system comprising:
   a transmitting portion transmitting a plurality of packets with multiplexing, wherein a header in each packet includes a first field holding a signal indicative of a packet length, a second field holding a signal indicative of a preferential order upon transferring the packet, a third field holding a signal indicative of a kind of traffic, a fourth field holding a signal indicative of a header length, a fifth field holding a control signal depending upon the kind of traffic, and a sixth field holding a signal indicative of a result of CRC operation of the header, and a payload of the packets holds an information signal depending upon kind of the traffic and a signal indicative of a result of CRC operation of the payload;
   a relay node outputting said packet to an output path depending upon the destination address or a label added to the packet received from said transmitting portion; and
   a receiving portion separating said packet received from said relay node and inputting to a switching equipment, an asynchronous transmission mode switch or internet protocol router after performing a predetermined speed changing process,
   wherein said traffic is one or more kinds among a synchronous transmission mode, asynchronous transmission mode and an internet protocol,
   wherein said multiplexed packet further includes an OAM packet used for maintenance of the network and management of operation, and stuff bytes for maintaining a period of the multiplexed packet, and wherein said transmitting portion comprises:
   (a) a switching equipment comprising a digital subscriber transporting device, a local switching equipment or a tandem switching equipment, a signal processing portion processing a synchronous transmission mode signal output from said switching equipment, a synchronous transmission mode processing portion recognizing a leading position of said synchronous transmission mode signal and a data length, a first FIFO storing an output of said signal processing portion, a second FIFO storing an output of said synchronous transmission mode processing portion, a first packet composing portion input an output of said first FIFO and a second packet composing portion input an output of said FIFO;

(b) an asynchronous transmission mode switch, an asynchronous transmission mode cell order controlling portion input an asynchronous transmission mode cell output from said asynchronous transmission mode switch, a third FIFO storing an output of said asynchronous transmission mode cell order controlling portion and a third packet composing portion input an output of said third FIFO;

(c) an internet protocol router, an internet protocol preference control portion input an internet protocol packet data output from said internet protocol router, a fourth FIFO storing an output of said internet protocol preference control portion and a fourth packet composing portion input an output of said fourth FIFO; and (d) a packet multiplexing portion multiplexing outputs of said first, second, third and fourth packet composing portions, a stuff byte generating portion generating a predetermined stuff byte for outputting, and an OAM packet generating portion generating an OAM packet for outputting.

30. A network system comprising:

a transmitting portion transmitting a plurality of packets with multiplexing, wherein a header in each packet includes a first field holding a signal indicative of a packet length, a second field holding a signal indicative of a preferential order upon transferring the packet, a third field holding a signal indicative of a kind of traffic, a fourth field holding a signal indicative of a header length, a fifth field holding a control signal depending upon the kind of traffic, and a sixth field holding a signal indicative of a result of CRC operation of the header, and a payload of the packets holds an information signal depending upon kind of the traffic and a signal indicative of a result of CRC operation of the payload;

a relay node outputting said packet to an output path depending upon the destination address or a label added to the packet received from said transmitting portion; and a receiving portion separating said packet received from said relay node and inputting to a switching equipment, an asynchronous transmission mode switch or internet protocol router after performing a predetermined speed changing process, wherein said traffic is one or more kinds among a synchronous transmission mode, asynchronous transmission mode and an internet protocol, wherein said multiplexed packet further includes an OAM packet used for maintenance of the network and management of operation, and stuff bytes for maintaining a period of the multiplexed packet, and wherein said receiving portion comprises:

(a) a packet demultiplexing portion separating received packets and an OAM packet detecting portion for detecting the OAM packet;

(b) a first packet decomposing portion processing a signaling packet in synchronous transmission mode input from the packet demultiplexing portion for generating and outputting data, clock and a primitive, a first speed changing portion generating an original clock in the sender on the basis of a received clock, a second packet decomposing portion processing the packet in synchronous transmission mode input from the packet demultiplexing portion for generating and outputting data, clock and a primitive, a second speed changing portion generating an original clock in the sender on the basis of a received clock, a switching equipment constituted of the digital subscriber transporting device, local switching equipment or a tandem switching equipment and receiving outputs of said first and second speed changing portions;

(c) a third packet decomposing portion processing a signaling packet in asynchronous transmission mode input from the packet demultiplexing portion for generating and outputting data and clock, a third speed changing portion generating an original clock in the sender on the basis of a received clock, and the asynchronous transmission mode switch receiving outputs of said third speed changing portion; and (d) a fourth packet decomposing portion processing a signaling packet in internet protocol input from the packet demultiplexing portion for generating and outputting data and clock, a fourth speed changing portion generating an original clock in the sender on the basis of a received clock, and the internet protocol router receiving outputs of said fourth speed changing portion.

31. A network system as set forth in claim 30, wherein said speed changing portion comprises a buffer memory storing the clock output from the packet decomposing portion and a PLL extracting an average frequency of the clock before being stored in the buffer memory for reading out the clock stored in the buffer memory according to the clock of the average frequency.

* * * * *